US012155150B2

(12) United States Patent
Huang

(10) Patent No.: US 12,155,150 B2
(45) Date of Patent: Nov. 26, 2024

(54) SOLDER-FREE CONNECTOR

(71) Applicant: Sound Plug Electronic Co., Ltd., Tainan (TW)

(72) Inventor: Tzu-Che Huang, Tainan (TW)

(73) Assignee: Sound Plug Electronic Co., Ltd., Tainan (TW)

( * ) Notice: Subject to any disclaimer, the term of this patent is extended or adjusted under 35 U.S.C. 154(b) by 400 days.

(21) Appl. No.: 17/841,649

(22) Filed: Jun. 15, 2022

(65) Prior Publication Data

US 2023/0268686 A1 Aug. 24, 2023

(30) Foreign Application Priority Data

Feb. 21, 2022 (TW) ................................ 111201748

(51) Int. Cl.
*H01R 13/00* (2006.01)
*H01R 13/52* (2006.01)
*H01R 13/631* (2006.01)

(52) U.S. Cl.
CPC ....... *H01R 13/5202* (2013.01); *H01R 13/631* (2013.01)

(58) Field of Classification Search
CPC ......................... H01R 13/5205; H01R 13/631; A61N 1/3752; A61N 1/0531; A61N 1/0534; A61N 1/0551; H01B 3/305; H01B 3/306
See application file for complete search history.

(56) References Cited

U.S. PATENT DOCUMENTS 7,083,474 B1 * 8/2006 Fleck ................. H01R 13/5804 439/669
7,422,469 B1 * 9/2008 Chang ................ H01R 13/6485 439/449
7,500,882 B2 * 3/2009 Goetz .................... H01R 24/38 439/669
8,128,460 B2 * 3/2012 Voges ..................... B24C 1/086 451/39
2003/0082949 A1 * 5/2003 Parrish ................... H01R 24/58 439/578
2008/0188137 A1 * 8/2008 Goetz ................ H01R 13/2471 439/669

* cited by examiner

*Primary Examiner* — Phuong Chi Thi Nguyen

(57) ABSTRACT

A solder-free connector is provided, including a tip, an insulating ring, a metal collet, a shaft sleeve, a cable, a cover body, and a flange seal. The tip includes a base, a tip body at a first side of the base, and a tip guide at a second side opposite to the first side of the base. The insulating ring, neighboring the second side of the base, is disposed with a first insertion space to accommodate the tip guide. The metal collet, neighboring one side of the insulating ring, is disposed with a second insertion space to accommodate the tip guide, and the tip guide protrudes from the metal collet. The shaft sleeve, sleeved on the insulating ring, is disposed with an accommodation space to accommodate the tip guide, the insulating ring, the metal collet, and the cable, and one end of the cable contacts the tip guide.

12 Claims, 4 Drawing Sheets

SOLDER-FREE CONNECTOR

CROSS-REFERENCE TO RELATED APPLICATION

This application claims priority from Taiwan Patent Application No. 111201748, filed on Feb. 21, 2022, in the Taiwan Intellectual Property Office, the content of which is hereby incorporated by reference in its entirety for all purposes.

BACKGROUND OF THE INVENTION

1. Field of the Invention

The present disclosure relates to a connector, particularly to a solder-free connector connected to one end of a cable without soldering.

2. Description of the Related Art

A conventional cable connector, such as a phone connector or TRS (tip, ring, sleeve) connector, is often fixedly installed on one end of a cable, and the cable has an outer sleeve disposed along a length direction, an insulating inner sleeve coaxially disposed in the outer sleeve, a plurality of surrounding wires around the inner sleeve, and a central lead wire that protrudes from the inner sleeve and transmits signals.

Furthermore, a conventional cable connector often includes: a metal base, an insulating ring installed in the base, a central guide inserted in the base, a metal clamp ring installed at a bottom edge of the base, and a sealed sleeve that is sleeved on the cable and can be screwed with the base. Wherein, the central guide has a soldering end extending in the direction of the cable; the clamp ring has a fixing part that clamps under the base, a soldering part extending from the fixing part to the cable, and a clamping part that is located under the soldering part and can be clamped to the outer sleeve of the cable. When assembled, the cable may be a coaxial cable including a central lead wire, and the central lead wire of the cable is moved close to the soldering end of the central guide for fixation via using soldering material, and the plurality of surrounding wires are pulled to the soldering part of the clamp ring for fixation via using soldering material; lastly, the sealed sleeve is screwed onto the base to complete the assembly process.

However, the above-mentioned method of attaching the tip to one end of the cable by soldering has the following disadvantages. Firstly, when assembled, the central lead wire must be soldered to the soldering end of the central guide, and the surrounding wires are arranged and then pulled toward the soldering part of the clamp ring before soldering; therefore, the assembly process is more complicated, and the quality stability of the assembly is also easily affected by operators. Additionally, many countries currently have many restrictions on the import of soldering material. For example, European countries have gradually banned the import of goods with soldering material containing lead. Due to the above-mentioned restrictions on soldering material, special attention must be paid to the selection of soldering material and the regulations in different countries during the manufacture of tips; therefore, conventional connectors are less environmentally friendly to manufacture and also restricted in terms of the selection of materials.

SUMMARY OF THE INVENTION

In this view, the inventor has invented a solder-free connector based on many years of research and practical experience in related fields, in order to tackle the problems mentioned in the prior art.

To solve the above-mentioned problems existing in the prior art, the present disclosure provides a solder-free connector configured to receive one end of a cable, including a tip, an insulating ring, a metal collet, a shaft sleeve, a cable, a cover body, and a flange seal. Wherein, the tip includes a base, a first side of the base has a tip body, and a second side opposite to the first side has a tip guide extending in an axial direction. The insulating ring is disposed to neighbor the second side of the base, and the insulating ring is disposed with a first insertion space along the axial direction to accommodate the tip guide. The metal collet is disposed to neighbor one side of the insulating ring, and the metal collet is disposed with a second insertion space along the axial direction to accommodate the tip guide. The shaft sleeve is configured to be sleeved on the insulating ring, such that an accommodation space disposed within the shaft sleeve along the axial direction accommodates the tip guide, the insulating ring, the metal collet, and the cable, and such that one end of the cable contacts the tip guide.

Preferably, the solder-free connector further includes a cover body connected to one end of the shat sleeve.

Preferably, one end of the shaft sleeve has a first fixing part, one side of the cover body has a second fixing part, and the first fixing part and the second fixing part are detachably connected to each other.

Preferably, a top cover or a surrounding wall of the cover body is disposed with a through hole for the cable to pass through.

Preferably, the solder-free connector further includes a flange seal, disposed between the shaft sleeve and the cover body.

Preferably, an inner diameter of the flange seal is disposed corresponding to an outer diameter of the cable to prevent moisture from entering the shaft sleeve.

Preferably, materials of the tip, the metal collet, the shaft sleeve, and the cover body include copper, aluminum, and iron.

Preferably, the tip, the metal collet, the shaft sleeve, and the cover body include a plated layer, and the plated layer includes bright chromium, bright nickel, non-electrolytic nickel, or gold.

Preferably, one end of the tip guide is arranged with a pin-shaped structure.

Preferably, the pin-shaped structure is disposed with a thread thereon to fix the cable.

Preferably, the pin-shaped structure protrudes away from the metal collet.

Preferably, an inner wall of the shaft sleeve is disposed with a limit part, and an inner diameter of the limit part is disposed corresponding to an outer diameter of the metal collet to fix the metal collet.

In summary, in the assembly process of the solder-free connector of the present disclosure, one end of the cable is simply inserted into the accommodation space of the shaft sleeve in such a way that the one end of the cable is linked to one end of the tip guide with a thread; lastly, the cover body is screwed to the shaft sleeve, so that the cable and the tip may be securely assembled without soldering. Furthermore, the solder-free connector is disposed with a flange seal between the shaft sleeve and the cable so as to prevent moisture from entering the shaft sleeve, which further affects the connection between the tip and the cable or causes corrosion to the elements inside the shaft sleeve; this would help to increase the reliability of the solder-free connector of the present disclosure. By doing so, the solder-free connector of the present disclosure has the advantages of being free from soldering, environmentally friendly, easy to assemble, and waterproof, which may avoid affecting quality stability due to the human factor when using conventional soldering methods.

BRIEF DESCRIPTION OF THE DRAWINGS

To explain the technical solution of the present disclosure more clearly, the embodiments together with the related figures are to be illustrated as follows.

DESCRIPTION OF THE PREFERRED EMBODIMENTS

To facilitate the review of the technical features, contents, advantages, and achievable effects of the present disclosure, the embodiments together with the accompanying drawings are described in detail as follows. However, the drawings are used only for the purpose of indicating and supporting the specification, which is not necessarily the real proportion and precise configuration after the implementation of the present disclosure. Therefore, the relations of the proportion and configuration of the accompanying drawings should not be interpreted to limit the actual scope of implementation of the present disclosure.

It should be noted that although the terms first, second, and the like may be used in the present disclosure to describe various elements, components, regions, sections, layers, and/or parts, these elements, components, regions, sections, layers, and/or parts should not be limited by these terms. These terms are only used to distinguish one element, component, region, layer, and/or part from another element, component, region, layer, and/or part. Hence, the first element, first component, first region, first layer, and/or first part discussed hereinafter may be referred to as second component, second region, second layer, and/or second part without departing from the teachings of the present disclosure.

In addition, the terms "include" and/or "contain" are used to indicate the presence of features, regions, entirety, steps, operations, elements, and/or components, but may not exclude the presence or addition of one or more of other features, regions, entirety, steps, operations, elements, components, and/or combinations thereof.

Unless otherwise defined, all terms (including technical and scientific terms) used in the present disclosure have the same meaning as those commonly understood by a person with ordinary skill in the art. It may be understood that, unless explicitly defined herein, the terms such as those defined in commonly used dictionaries should be interpreted as having definitions consistent with their meaning in the context of the related art and the present disclosure, and should not be construed as idealized or overly formal.

Figure 1:
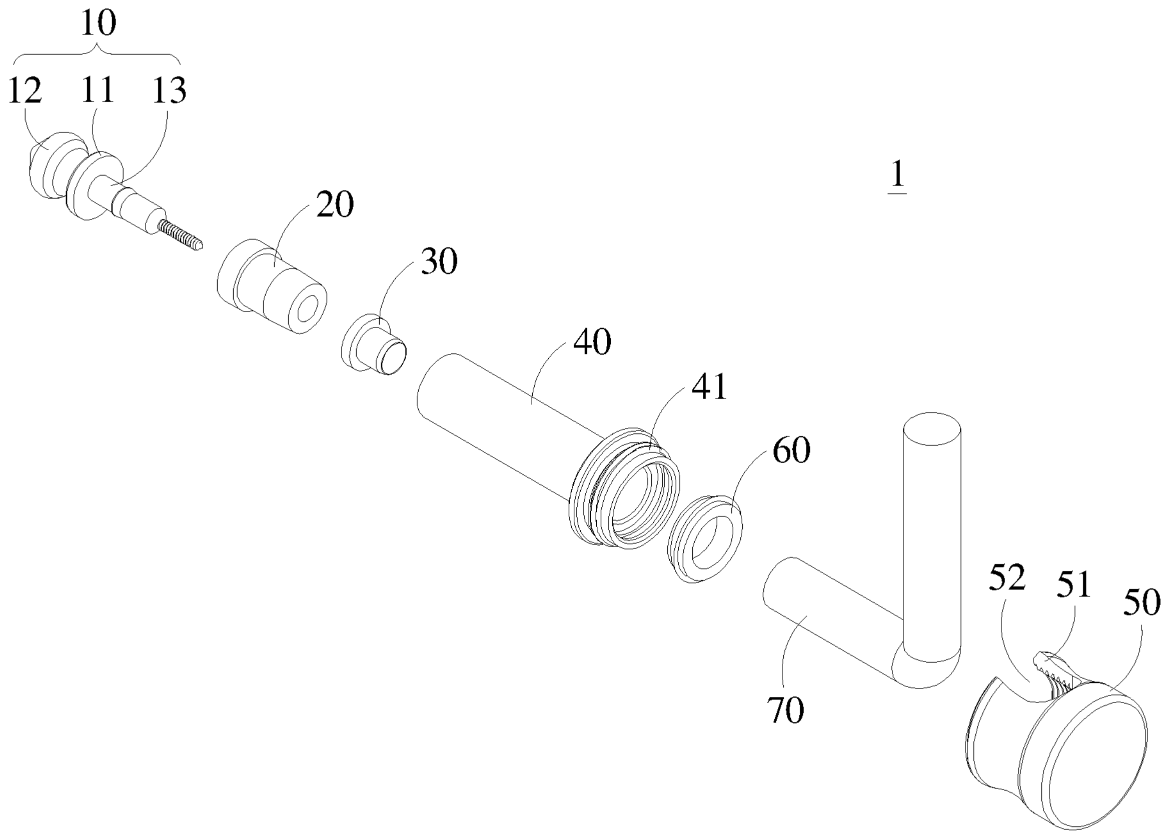
FIG. 1 is a schematic diagram of a breakdown structure of the solder-free connector according to the embodiment of the present disclosure.
Figure 2:
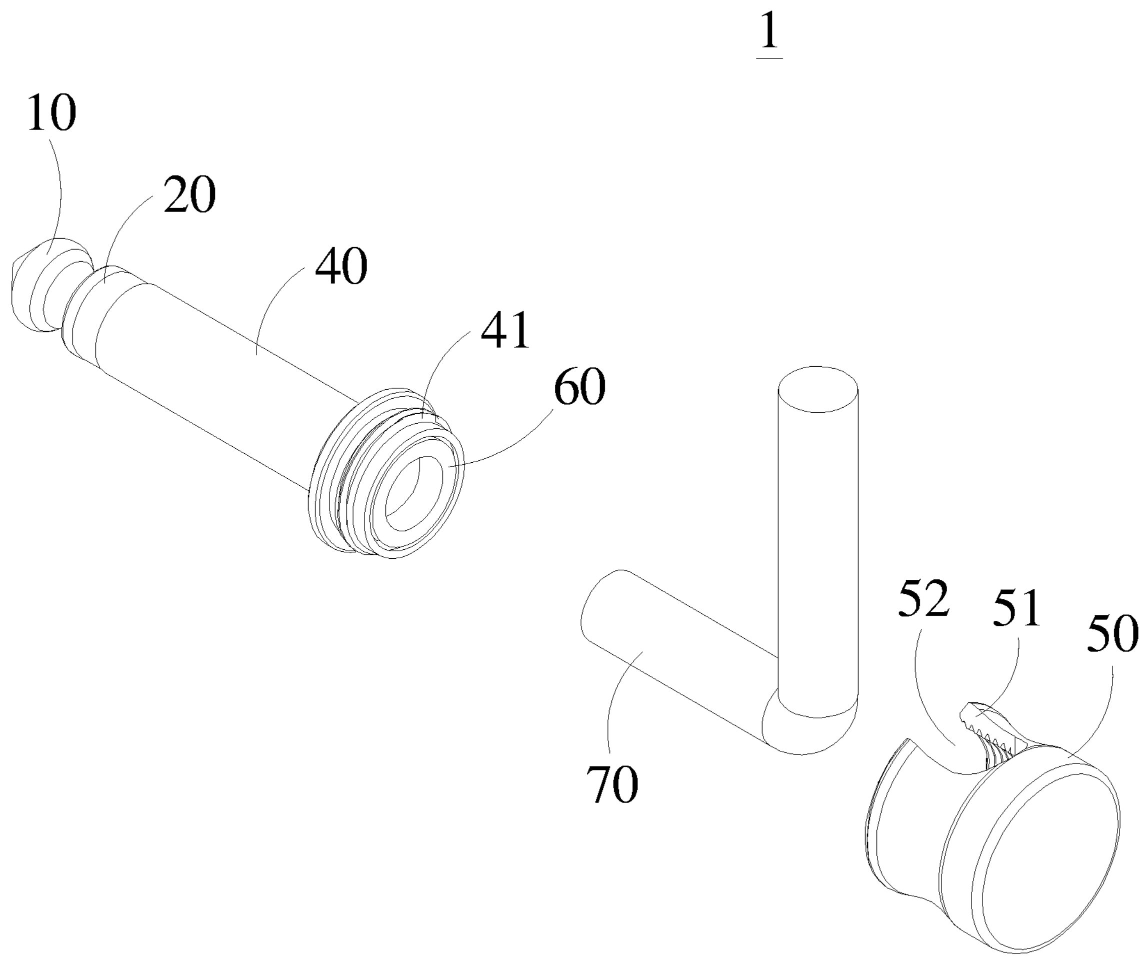
FIG. 2 is a schematic diagram of another breakdown structure of the solder-free connector according to the embodiment of the present disclosure.
Figure 3:
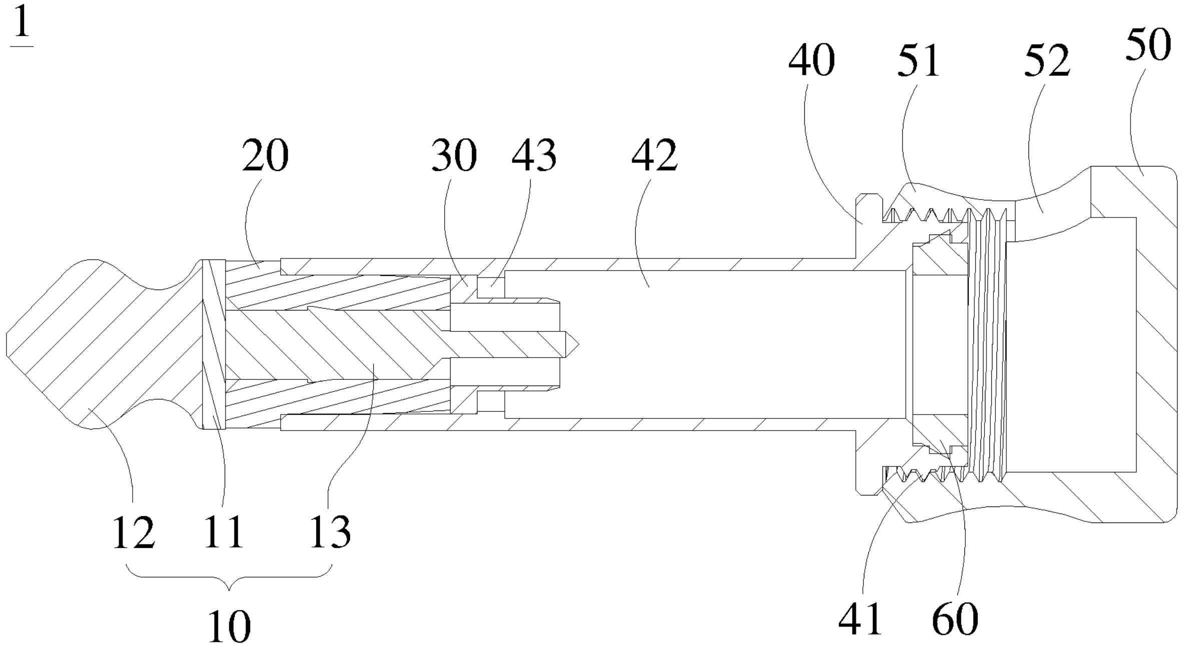
FIG. 3 is a schematic diagram of a cross-section structure of the solder-free connector before the disposition of a cable according to the embodiment of the present disclosure.
Figure 4:
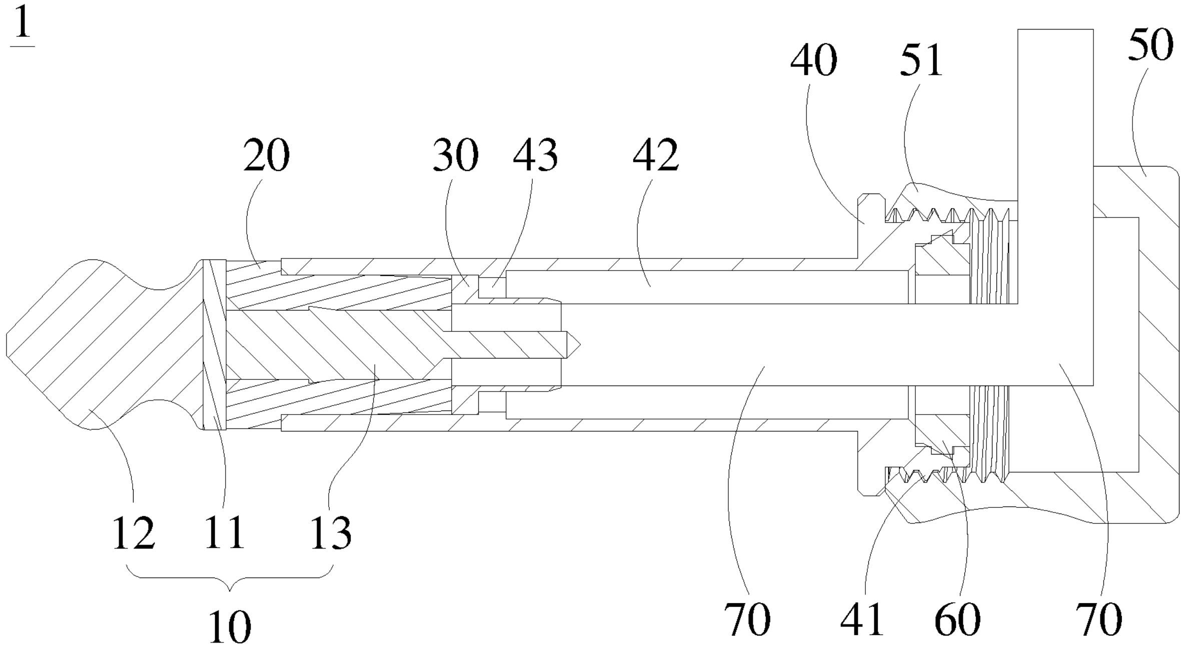
FIG. 4 is a schematic diagram of a cross-section structure of the solder-free connector after the disposition of a cable according to the embodiment of the present disclosure.

Please refer to FIG. 1 to FIG. 4; FIG. 1 is a schematic diagram of a breakdown structure of the solder-free connector according to the embodiment of the present disclosure; FIG. 2 is a schematic diagram of another breakdown structure of the solder-free connector according to the embodiment of the present disclosure; FIG. 3 is a schematic diagram of a cross-section structure of the solder-free connector before the disposition of a cable according to the embodiment of the present disclosure; and FIG. 4 is a schematic diagram of a cross-section structure of the solder-free connector after the disposition of a cable according to the embodiment of the present disclosure.

As depicted in FIG. 1, one embodiment of the present disclosure provides a solder-free connector 1 configured to receive one end of a cable 70. The solder-free connector 1 of the present disclosure may include a tip 10, an insulating ring 20, a metal collet 30, a shaft sleeve 40, a cover body 50, and a flange seal 60. Wherein, the tip 10 may include a base 11, a first side of the base 11 may be provided with a tip body 12, and a second side opposite to the first side of the base 11 may be provided with a tip guide 13 extending in an axial direction. The insulating ring 20 may be disposed to neighbor the second side of the base 11. The insulating ring 20 may be disposed with a first insertion space along the axial direction to accommodate the tip guide 13. The metal collet 30 may be disposed to neighbor one side of the insulating ring 20. The metal collet 30 may be disposed with a second insertion space along the axial direction to accommodate the tip guide 13. The tip guide 13 may further be provided with a pin-shaped structure at one end, and the pin-shaped structure may protrude away from the metal collet 30. The shaft sleeve 40 may be configured to be sleeved on the insulating ring 20, such that an accommodation space 42 within the shaft sleeve 40 along the axial direction may accommodate the tip guide 13, the insulating ring 20, the metal collet 30, and the cable 70, which allows one end of the cable 70 to contact the tip guide 13. Specifically, a lead wire of the cable 70 may be in electrical connection with the pin-shaped structure of the tip guide 13. Furthermore, the cover body 50 may be screwed onto one end of the shaft sleeve 40. The flange seal 60 may be disposed between the shaft sleeve 40 and the cover body 50, and the flange seal 60 may be made of silicone material.

Specifically, one end of the shaft sleeve 40 may be provided with a first fixing part 41, and one side of the cover body 50 may be provided with a second fixing part 51. The first fixing part 41 and the second fixing part 51 may be detachably connected to each other. In the present embodiment, one end of the shaft sleeve 40 may be disposed with an external thread as the first fixing part 41, and one end of the cover body 50 may be disposed with an internal thread as the second fixing part 51. The shaft sleeve 40 and the cover body 50 may be detachably connected to each other by screwing the second fixing part 51 onto the first fixing part 41; however, the present disclosure should not be limited thereto. In other embodiments, the shaft sleeve and the cover body may be disposed with other types of connection structures, such as tenons and mortise holes, as the first fixing part and second fixing part.

Specifically, as depicted in FIG. 2, the tip 10, the insulating ring 20, the metal collet 30, the shaft sleeve 40, and the flange seal 60 may be pre-assembled. The cable 70 may be inserted into the shaft sleeve 40 when the cable 70 needs to be connected. The tip guide 13 and the cable 70 may then be coupled to each other. Specifically, one end of the tip guide 13 may be provided with a pin-shaped structure, and the pin-shaped structure may be provided with a thread and inserted into the cable 70. The connection between the tip guide 13 and the cable 70 may therefore be further strengthened. Lastly, The first fixing part 41 of the shaft sleeve 40 and the second fixing part 51 of the cover body 50 may be connected to each other, so that the tip 10 and the cable 70 may be assembled in a solder-free manner to achieve the solder-free connector 1 of the present disclosure.

As depicted in FIG. 3 and FIG. 4, the inner wall of the shaft sleeve 40 may be disposed with a limit part 43, and the inner diameter of the limit part 43 may be disposed corresponding to the outer diameter of the metal collet 30, in such a way that the shaft sleeve 40 may fix the metal collet 30 by the disposition of the limit part 43 when the shaft sleeve 40 is sleeved onto the insulating ring 20 and the metal collet 30, and that one end of the tip guide 13 protruding from the metal collet 30 may be positioned in the accommodation space 42 of the shaft sleeve 40, so one end of the tip guide 13 disposed with a thread may be screwed into one end of the cable 70 when the cable 70 is to be assembled later on. Wherein, the metal collet 30 may be disposed with an abutting part adjacent to one end of the insulating ring 20, and the outer diameter of the abutting part may be substantially the same as the inner diameter of the shaft sleeve 40, in such a way that the abutting part of the metal collet 30 may abut against the limit part 43 when the shaft sleeve 40 is sleeved on the insulating ring 20 and the metal collet 30, and a part of the metal collet 30 may be fixed to the limit part 43 of the shaft sleeve 40, so as to further achieve the effect of fixation.

Additionally, an inner diameter of the flange seal 60 may be disposed corresponding to an outer diameter of the cable 70, in such a way that the opening of the shaft sleeve 40 may be effectively sealed to prevent external humidity or moisture from entering the shaft sleeve 40, which would affect the conduction between the cable 70 and the tip guide 13 or corrode the cable 70 and the tip guide 13 disposed in the shaft sleeve 40 after the cable 70 is inserted into the shaft sleeve 40 and connected to the tip guide 13; this helps to improve the reliability of the solder-free connector 1 of the present disclosure.

Furthermore, in the present embodiment, a through hole 52 may be disposed on the surrounding wall of the cover body 50 for the cable 70 bent in an L-shape to pass through. Because the cable 70 is bent in the L-shape, the part of the cable 70 perpendicular to the axial direction will abut against the through hole 52 of the cover body 50 when the solder-free connector 1 is inserted or removed, further preventing the cable 70 from easily falling apart.

Further, in the present embodiment, the tip 10, the metal collet 30, the shaft sleeve 40, and the cover body 50 may be made of C3604 brass, and the insulating ring 20 may be made of polyoxymethylene (POM); however, the present disclosure should not be limited thereto. In other embodiments, other types of metal materials, such as aluminum and iron, may be used to make tips, metal collets, shaft sleeves, and cover bodies according to users' requirements or manufacturing costs; likewise, other types of insulating materials may also be used to make bench insulators.

In the present embodiment, it is worth mentioning that the tip 10, the metal collet 30, the shaft sleeve 40, and the cover body 50 may be all surface-treated with a plated layer, and the material of the plated layer includes bright chromium, bright nickel, non-electrolytic nickel, or gold (Au). Specifically, the surface of the shaft sleeve 40 may have a bright nickel-plated layer, the surface of the cover body 50 may have a bright chromium-plated layer, and the surfaces of the tip 10 and the metal collet 30 may have a non-electrolytic nickel layer; however, the present disclosure should not be limited thereto. In other embodiments, other types of plated layers of each of the metal components as mentioned above may be selected according to users' requirements or manufacturing costs.

In summary, in the assembly process of the solder-free connector of the present disclosure, one end of the cable may be simply inserted into the accommodation space of the shaft sleeve in such a way that one end of the cable is linked to one end of the tip guide with a thread; lastly, the cover body may be screwed to the shaft sleeve, so that the cable and tip may be securely assembled without soldering. Furthermore, the solder-free connector may be disposed with a flange seal between the shaft sleeve and the cable so as to prevent moisture from entering the shaft sleeve, which further affects the connection between the tip and the cable or causes corrosion to the elements inside the shaft sleeve; this would help to increase the reliability of the solder-free connector of the present disclosure. By doing so, the solder-free connector of the present disclosure may be provided with the advantages of being free from soldering, environmentally friendly, easy to assemble, and waterproof, which may avoid affecting quality stability due to the human factor when using conventional soldering methods.

The present disclosure is illustrated with reference to exemplary embodiments. It may be understood by a person with ordinary skill in the art that various changes and equivalent arrangements in form and detail may be made without departing from the concept and scope of the present disclosure as defined in the claims. Therefore, the protection scope for the present disclosure should be determined by the scope of the appended claims.

What is claimed is:

1. A solder-free connector, configured to receive one end of a cable, comprising:
- a tip, comprising a base, a first side of the base having a tip body and a second side opposite to the first side having a tip guide extending in an axial direction;
- an insulating ring, neighboring the second side of the base, the insulating ring being disposed with a first insertion space along the axial direction to accommodate the tip guide;
- a metal collet, neighboring one side of the insulating ring, the metal collet being disposed with a second insertion space along the axial direction to accommodate the tip guide; and
- a shaft sleeve, configured to be sleeved on the insulating ring, such that an accommodation space disposed within the shaft sleeve along the axial direction accommodates the tip guide, the insulating ring, the metal collet and the cable, and such that one end of the cable contacts the tip guide.

2. The solder-free connector according to claim 1, wherein an inner wall of the shaft sleeve is disposed with a limit part, and an inner diameter of the limit part is disposed corresponding to an outer diameter of the metal collet to fix the metal collet.

3. The solder-free connector according to claim 1, wherein one end of the tip guide is arranged with a pin-shaped structure.

4. The solder-free connector according to claim 3, wherein the pin-shaped structure is disposed with a thread thereon to fix the cable.

5. The solder-free connector according to claim 3, wherein the pin-shaped structure protrudes away from the metal collet.

6. The solder-free connector according to claim 1, further comprising a cover body connected to one end of the shaft sleeve.

7. The solder-free connector according to claim 6, wherein one end of the shaft sleeve has a first fixing part, one side of the cover body has a second fixing part, and the first fixing part and the second fixing part are detachably connected to each other.

8. The solder-free connector according to claim 6, wherein a top cover or a surrounding wall of the cover body is disposed with a through hole for the cable to pass through.

9. The solder-free connector according to claim 6, wherein materials of the tip, the metal collet, the shaft sleeve, and the cover body comprise copper, aluminum, and iron.

10. The solder-free connector according to claim 6, wherein the tip, the metal collet, the shaft sleeve, and the cover body comprise a plated layer, and the plated layer comprises bright chromium, bright nickel, non-electrolytic nickel or gold.

11. The solder-free connector according to claim 6, further comprising a flange seal, disposed between the shaft sleeve and the cover body.

12. The solder-free connector according to claim 11, wherein an inner diameter of the flange seal is disposed corresponding to an outer diameter of the cable to prevent moisture from entering the shaft sleeve.

* * * * *